United States Patent
Carames et al.

(10) Patent No.: US 9,060,263 B1
(45) Date of Patent: Jun. 16, 2015

(54) INBOUND LTE ROAMING FOOTPRINT CONTROL

(75) Inventors: Miguel A. Carames, Martinez, CA (US); Paula Scharlach, San Ramon, CA (US); Amol Tuli, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 110 days.

(21) Appl. No.: 13/239,013

(22) Filed: Sep. 21, 2011

(51) Int. Cl.
*H04W 12/00* (2009.01)

(52) U.S. Cl.
CPC ..................................... *H04W 12/00* (2013.01)

(58) Field of Classification Search
CPC ........... H04W 8/00–8/30; H04W 12/00–12/12
See application file for complete search history.

(56) References Cited

U.S. PATENT DOCUMENTS

| | | | |
|---|---|---|---|
| 6,819,652 B1* | 11/2004 | Akhtar et al. .................. | 370/230 |
| 7,382,748 B1* | 6/2008 | Bharatia et al. ................ | 370/331 |
| 8,320,329 B2* | 11/2012 | Andreasen et al. ............. | 370/331 |
| 8,340,292 B1* | 12/2012 | Schnellbacher et al. ....... | 380/250 |
| 8,644,355 B2* | 2/2014 | Agarwal et al. ................ | 370/522 |
| 8,942,747 B2* | 1/2015 | Marsico .......................... | 455/515 |
| 2007/0124592 A1* | 5/2007 | Oyama ............................ | 713/171 |
| 2007/0206557 A1* | 9/2007 | Iyer et al. ....................... | 370/338 |
| 2008/0046963 A1* | 2/2008 | Grayson et al. .................... | 726/1 |
| 2008/0076413 A1* | 3/2008 | Jones .......................... | 455/432.3 |
| 2008/0159227 A1* | 7/2008 | Ulupinar et al. ............... | 370/331 |
| 2009/0022298 A1* | 1/2009 | Qiu et al. .................. | 379/211.01 |
| 2009/0172798 A1* | 7/2009 | Upp ................................. | 726/10 |
| 2009/0276827 A1* | 11/2009 | Zheng ................................ | 726/1 |
| 2010/0064135 A1* | 3/2010 | Thakare et al. ................. | 713/156 |
| 2010/0088400 A1* | 4/2010 | Andreasen et al. ............ | 709/223 |
| 2010/0197285 A1* | 8/2010 | Horn et al. .................. | 455/414.2 |
| 2010/0197307 A1* | 8/2010 | Horn et al. .................. | 455/435.1 |
| 2010/0208659 A1* | 8/2010 | Liebhart ......................... | 370/328 |
| 2010/0234022 A1* | 9/2010 | Winterbottom ............... | 455/433 |
| 2010/0285797 A1* | 11/2010 | Ghai et al. .................. | 455/426.1 |
| 2010/0325714 A1* | 12/2010 | Iyer et al. ........................... | 726/8 |
| 2011/0116382 A1* | 5/2011 | McCann et al. ............... | 370/241 |
| 2011/0126277 A1* | 5/2011 | McCann et al. ................. | 726/13 |
| 2011/0158090 A1* | 6/2011 | Riley et al. ..................... | 370/230 |
| 2011/0170506 A1* | 7/2011 | Zisimopoulous et al. ..... | 370/329 |
| 2011/0188397 A1* | 8/2011 | McCann et al. ............... | 370/252 |
| 2011/0191576 A1* | 8/2011 | Forsberg et al. ............... | 713/150 |
| 2011/0195710 A1* | 8/2011 | Nas et al. .................... | 455/432.3 |
| 2012/0129488 A1* | 5/2012 | Patterson et al. ............. | 455/406 |
| 2012/0147834 A1* | 6/2012 | Zisimopoulos et al. ...... | 370/329 |
| 2012/0163297 A1* | 6/2012 | Agarwal et al. ............... | 370/328 |
| 2012/0246325 A1* | 9/2012 | Pancorbo Marcos et al. | 709/227 |
| 2012/0269167 A1* | 10/2012 | Velev et al. .................... | 370/331 |

\* cited by examiner

*Primary Examiner* — Mehmood B Khan

(57) ABSTRACT

A method and article for authenticating a mobile station subscribed to a home network, in a visited network, includes the steps of receiving, at a visited proxy controlled by the visited network, a request to authenticate the mobile station on the visited network. Then, authorizing the mobile station on the visited network based on a parameter in the request and a policy stored on the visited proxy. The proxy communicates a denial of authorization to the visited network when the policy identifies a denial of service and the proxy communicates with the home network the request to authenticate the mobile station on the visited network, when the policy identifies an acceptance of service.

14 Claims, 6 Drawing Sheets

INBOUND LTE ROAMING FOOTPRINT CONTROL

TECHNICAL FIELD

The present subject matter relates to techniques and equipment to control the areas within a roaming LTE network in which an inbound roaming user can gain LTE data roaming services.

BACKGROUND

Currently in networks using the 3GPP (3rd Generation Partnership Project) standard, roaming footprint control is typically a two step process. Roaming is the condition when a user takes her mobile station outside her Home Public Mobile Network (HPMN) and attempts to use it. The HPMN is the network serviced by the network provider in which the user has her subscription. A Visited Public Mobile Network (VPMN) is the network into which the user has entered. Footprint control allows the VPMN to pick and choose, down to the access point level (using Access Point Names (APNs)), when and where a roaming user can receive service on the VPMN's network. The networks can be mobile (cellular) networks such as GSM (Global System for Mobile Communications), TDMA (Time Division Multiple Access), and CDMA (Code Division Multiple Access) networks.

The steps for the current footprint control include that the VPMN verifies that a roaming agreement exists between it and another network when a subscriber of the other network (i.e. the HPMN in this example) attempts to register in the VPMN. The user's HPMN grants or denies service access to the subscriber based upon her service agreement or contract.

In an example, Provider A acting as VPMN may have countrywide roaming agreement with Provider B, such that Provider A allows all roaming service requests from subscribers of Provider B to Provider B. Provider B is then responsible for granting or denying service for each individual roaming subscriber.

Further, Provider A may have roaming agreements with Provider C only in certain market(s). In this case, Provider A may deny roaming service requests from subscribers of Provider C whenever these attempts take place outside of the market where a roaming agreement exists. Similarly, whenever these attempts take place inside of the market where the roaming agreement exists, Provider A may proxy all roaming service requests for subscribers of Provider C to Provider C, who would be responsible for granting or denying service for each individual subscriber.

Additionally, the 3GPP standard provides a method for footprint control named Regional Restriction Zones. In this method the HPMN defines, configures and controls user restricted zones. The zone restriction information is provided to the VPMN by the HPMN when the HPMN provides the registration/attach information. The VPMN is then expected to enforce the zones requested by the HPMN. As it stands, a HPMN may only use one VPMN zone for the whole country, thus there is no regional control. On the VPMN side, there is no control over the regions. The VPMN only enforces whatever regional zones are defined, maintained and passed to it from the HPMN. Even if a HPMN divides the nation into smaller zones, the zones are typically not "small" enough. Thus, while the existing zones are somewhat effective, this scheme is restricted to large zones, in which some parts of the zone the user may have been able to receive service. Thus, the existing solution is over restrictive.

Hence a need exists to provide the VPMN with more granular control over the areas of its network where roaming is to be allowed on a roaming agreement basis

SUMMARY

The teachings herein alleviate one or more of the above noted problems with authenticating a mobile station roaming in a VPMN. An example of a method for authenticating the roaming mobile station, subscribed to the HPMN, in the VPMN. Some of the steps include receiving, at the visited MME, an attachment request from the mobile station. The MME then transmits to the visited Diameter edge agent the request to authenticate. The request to authenticate can either be an authorization information request message or an update location request message. Determining the authorization of the mobile station on the VPMN is based on one or more parameters in the request. The parameters can be a HPMN identifier and can include at least a Tracking Area ID. The parameter is used to determine and access the policy stored on the visited Diameter edge agent.

The policy is typically resident on the Diameter edge agent prior to the request and comprises information regarding the acceptance or the denial of service for the home network identifier. The policy can be based on an agreement between the HPMN and the VPMN. Determining an authorization includes accessing the information based on the home network identifier to determine authorization. Once the authorization has completed, the Diameter edge agent can communicate a denial of authorization to the visited network or can communicate the request to authenticate the mobile station on the visited network to the HPMN. The communication is based on whether the policy identifies a denial or acceptance of service.

If the Diameter edge agent denies the authorization of the mobile unit, then the Diameter edge agent transmits the authorization answer to the visited MME with the denial. The visited MME can then transmit to the mobile station an attachment rejection. Alternately, in the example of when the policy identifies an acceptance of service, the authorization request can be transmitted to the home Diameter edge agent controlled by the HPMN.

Further, an article of manufacture can include at least one machine readable storage medium and programming instructions embodied in said at least one medium for execution by one or more computers. The programming can configure one or more computers to be capable of performing functions for providing information on a VPMN. The functions include receiving a request to authenticate a mobile station on the VPMN and authorizing the mobile station on the VPMN based on a parameter in the request and a policy. The Diameter edge agent communicates a denial of authorization to the visited network when the policy identifies a denial of service or communicates the request to authenticate the mobile station on the VPMN when the policy identifies an acceptance of service.

The article can include an example where the parameter has a home network identifier, and the policy has information regarding the acceptance or the denial of service for the home network identifier. Additionally, the functions of the programming instructions for authorizing can include the function of accessing the information based on the home network identifier to determine authorization.

In another example, the functions of the programming instructions further include receiving, at a visited Mobility Management Entity (MME), an attachment request from the mobile station and transmitting, from the visited MME to the visited proxy, the request to authenticate.

The functions of the programming instructions for communicating the denial include transmitting an authorization answer to the visited MME, and transmitting to the mobile station, by the visited MME, an attachment rejection. Also, the function of communicating the request to authenticate the mobile station on the visited network further has the function of transmitting an authorization information request to a home proxy controlled by a HPMN.

Note that the policy can be based on an agreement between a home network of the mobile station and the visited network. Further, the parameter in the request is at least a tracking area ID.

As a result, the VPMN does not need to communicate with the HPMN if the user will be denied roaming services on the VPMN.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to techniques and equipment to perform VPMN roaming footprint control at a Diameter edge agent (also referred to as a Diameter agent or Diameter proxy).

Figure 1:
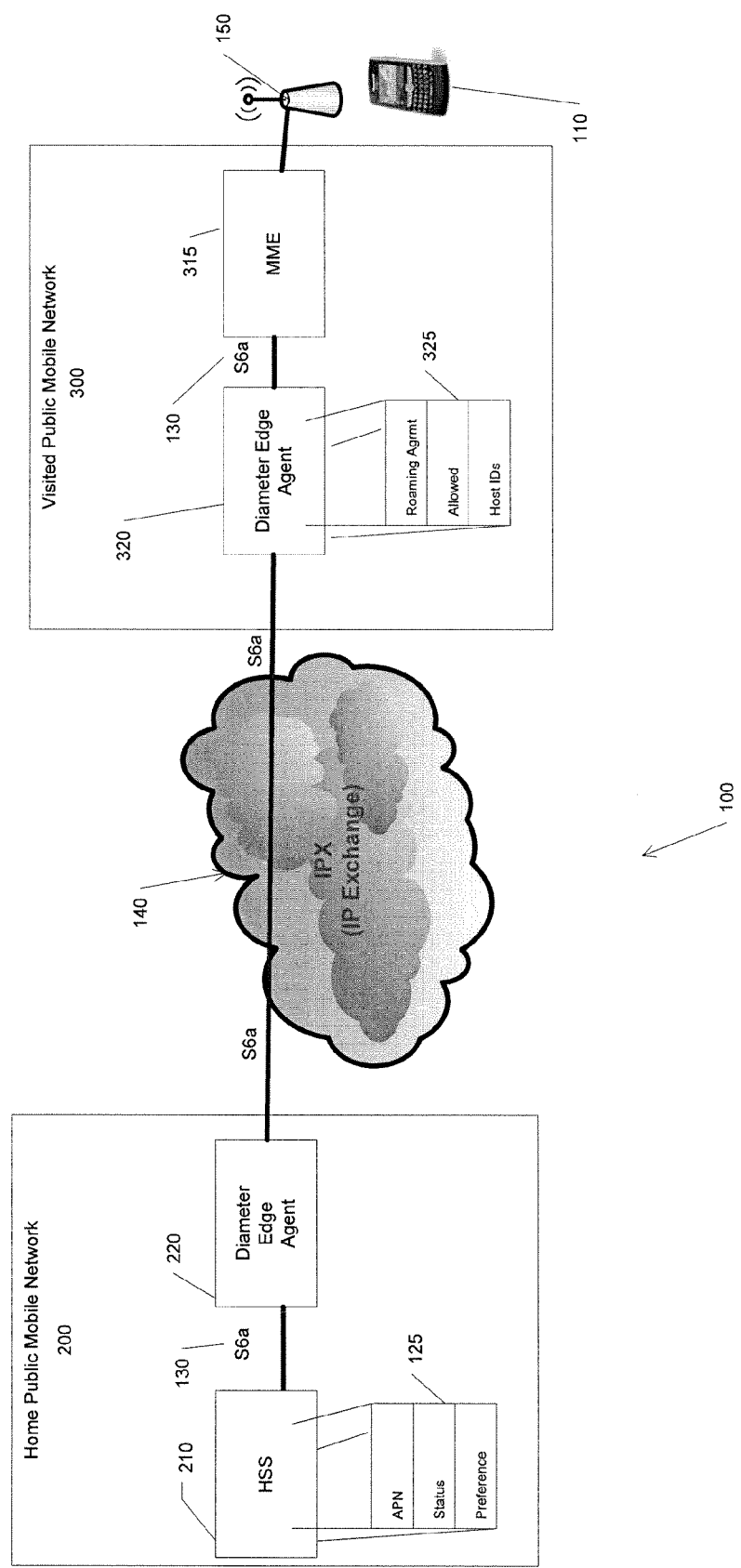
FIG. 1 is a functional block diagram describing a simplified network diagram for roaming from a HPMN to a VPMN.
Figure 5:
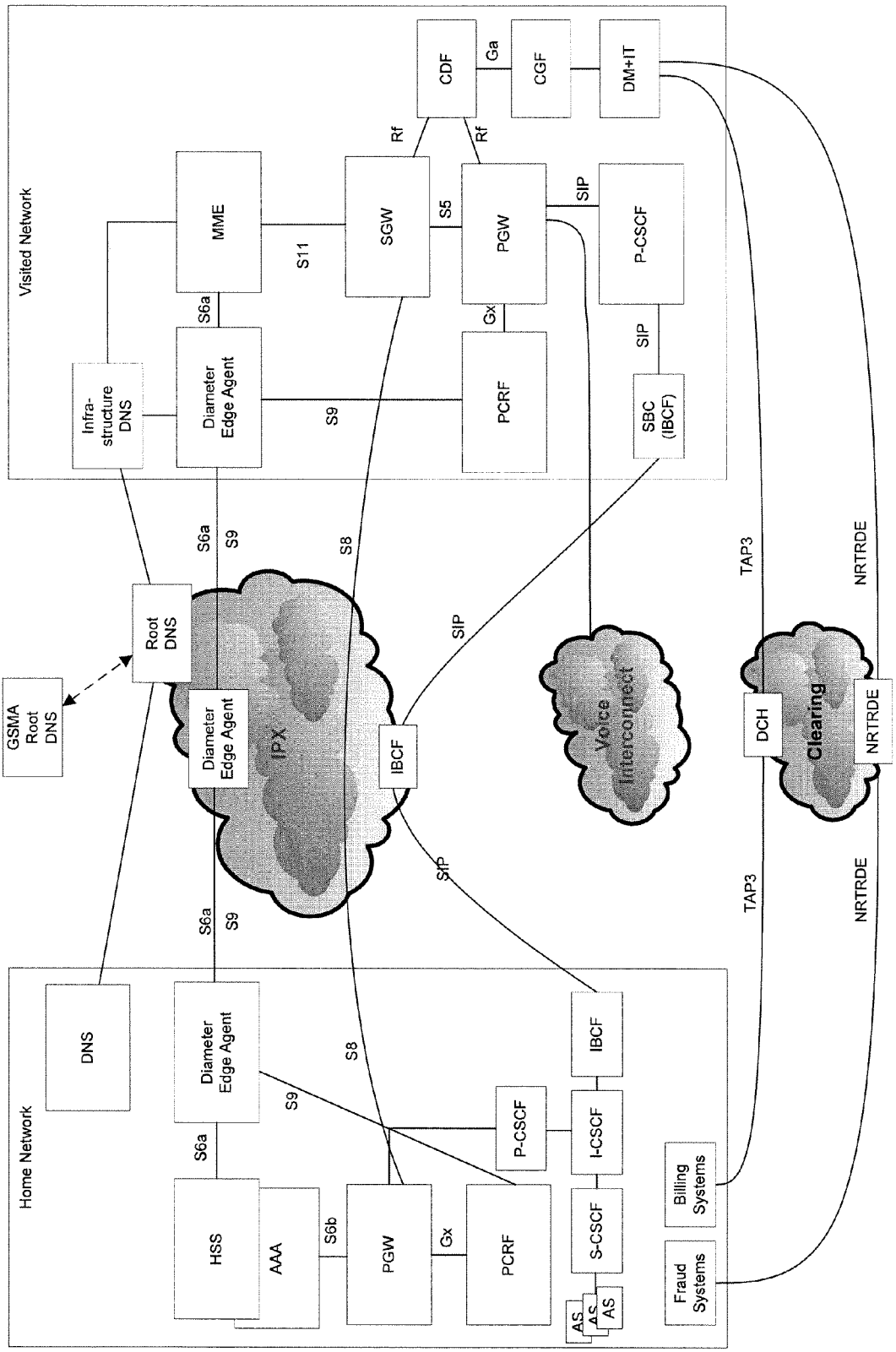
FIG. 5 is a functional block diagram illustrating a complete network diagram for the HPMN and the VPMN.

Reference now is made in detail to the examples illustrated in the accompanying drawings and discussed below. FIG. 1 illustrates a functional block diagram describing a simplified network diagram for a user's mobile station 110 roaming from a HPMN 200 to a VPMN 300. A simplified overall network 100 is a portion of a complete network illustrated at FIG. 5. Both the HPMN 200 and the VPMN 300 may have all of the features, hardware, and systems of other networks, however, in this example, only the relevant portions of the network are illustrated in FIG. 1. The HPMN 200 can have a Home Subscriber Server (HSS) 210. The HSS 210 evolved from a Home Location Register (HLR). In 3GPP networks, and particularly in the Long Term Evolution (LTE) architecture (for 3G and 4G networks), the HSS 210 can be a database of user (subscriber) information, i.e., customer profiles 125. The user information may include account information, account status, user preferences, features subscribed to by the user, user's current location, and allowable APNs. In roaming scenarios, the HSS 210 in the HPMN 300 provides the user profile to a Mobility Management Entity (MME) 315 in the VPMN 300.

Figure 3:
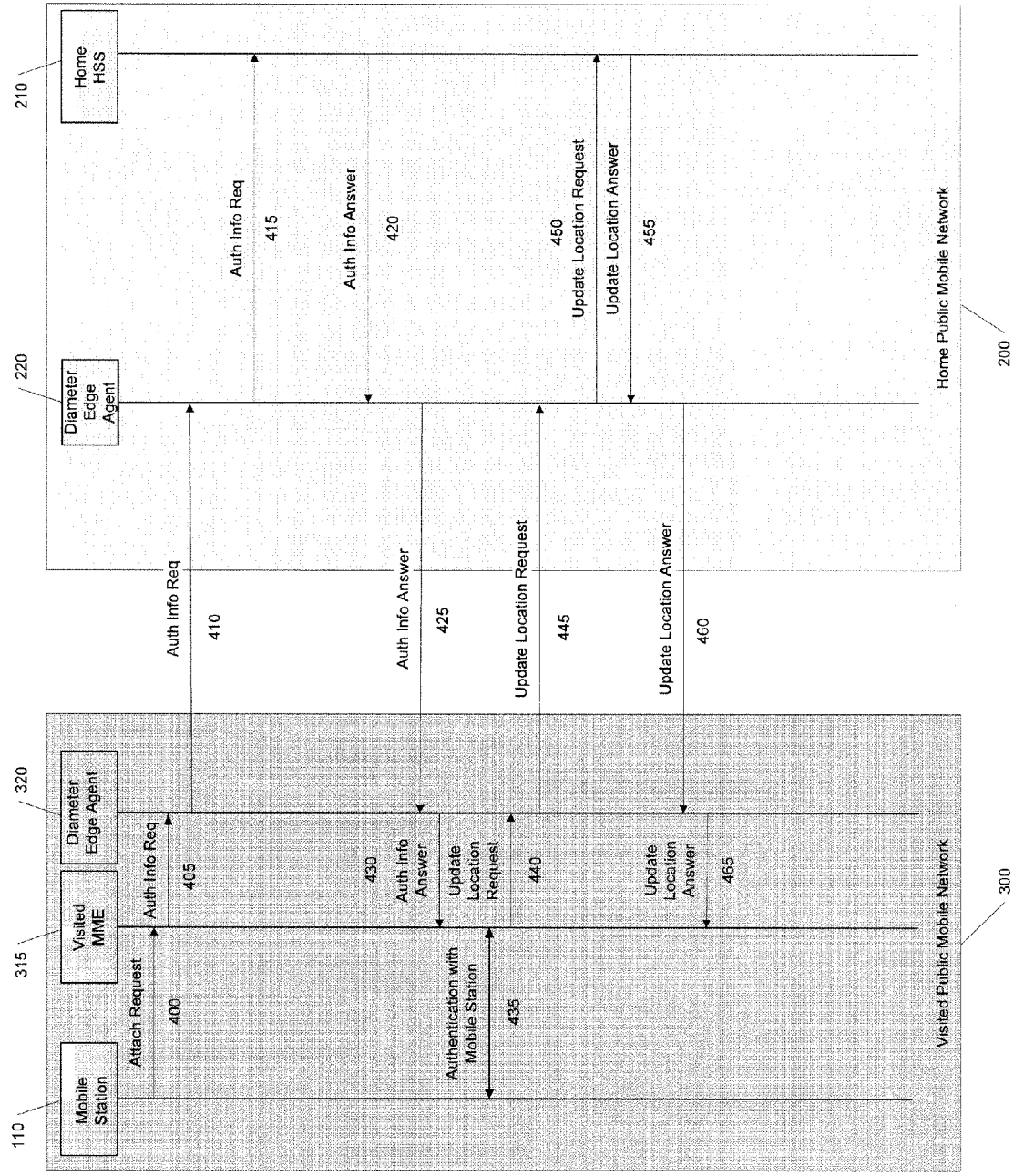
FIG. 3 is a message flow diagram permitting authorization a user's mobile station in a roaming area.

The MME 315 is a control-node for the LTE access-network, in that it can be a single point (or "node") within the network that integrates numerous core functions and control over network flow, load sharing, etc. It can be responsible for tracking, paging, and retransmission procedures to the user's mobile station 110. The MME 315 can also be involved in the user's mobile station activation/deactivation of service flows (also known as bearers) and is also responsible for authenticating the user when the user is roaming, by interacting with the HSS 210. FIG. 3 illustrates the MME 315, through the base station 150, authenticating the mobile station 110 in a back and forth communication 435. The authentication procedure 435 between the mobile station 110 and the MME 315 can involve multiple messages per current 3GPP standards (Authentication Request/Response, Security Mode Command/Complete, etc). The content and frequency of these messages are known to those of ordinary skill in the art.

The HSS 210 communicates with a Diameter edge agent 220 using an S6a protocol 130. The S6a protocol messages 130, in the simplified example of FIG. 1, can pass from the HSS 210 to the Diameter edge agent 220, over the network 140 to the VPMN's 300 Diameter edge agent 320 and to the MME 315.

The Diameter edge agent 320 is a roaming agent utilizing the Diameter protocol. The Diameter protocol is a next generation Authentication, Authorization, and Accounting (AAA) protocol for computer networks. The protocol facilitates the exchange of AAA related information within the network. A more complete description of the Diameter protocol can be found in a Request for Comments (RFC) 3588 (as published by the Internet Society, September 2003—which can be found at http://www.ietf.org/rfc/rfc3588.txt) which is incorporated herein by reference in its entirety. The roaming agent is a device in the network that facilitates the roaming capabilities of the provider's network. The Diameter edge agent 220, 320 can be considered as the only point of contact into and out of a network (either HPMN or VPMN) at the Diameter application level. As illustrated FIG. 4, communications between the HPMN 200 and the VPMN 300 can pass through multiple Diameter edge agents.

The S6a protocol 130 enables transfer of profile and authentication data for authenticating/authorizing user access between the HSS 210 of the HPMN 200 and the MME 315 of the VPMN 300. The MME 315 can be responsible for a number of tasks, as noted above. In the simplified example, the MME 315 also communicates with the base station/antenna 150 to receive information and requests from the mobile station 110.

Figure 2:
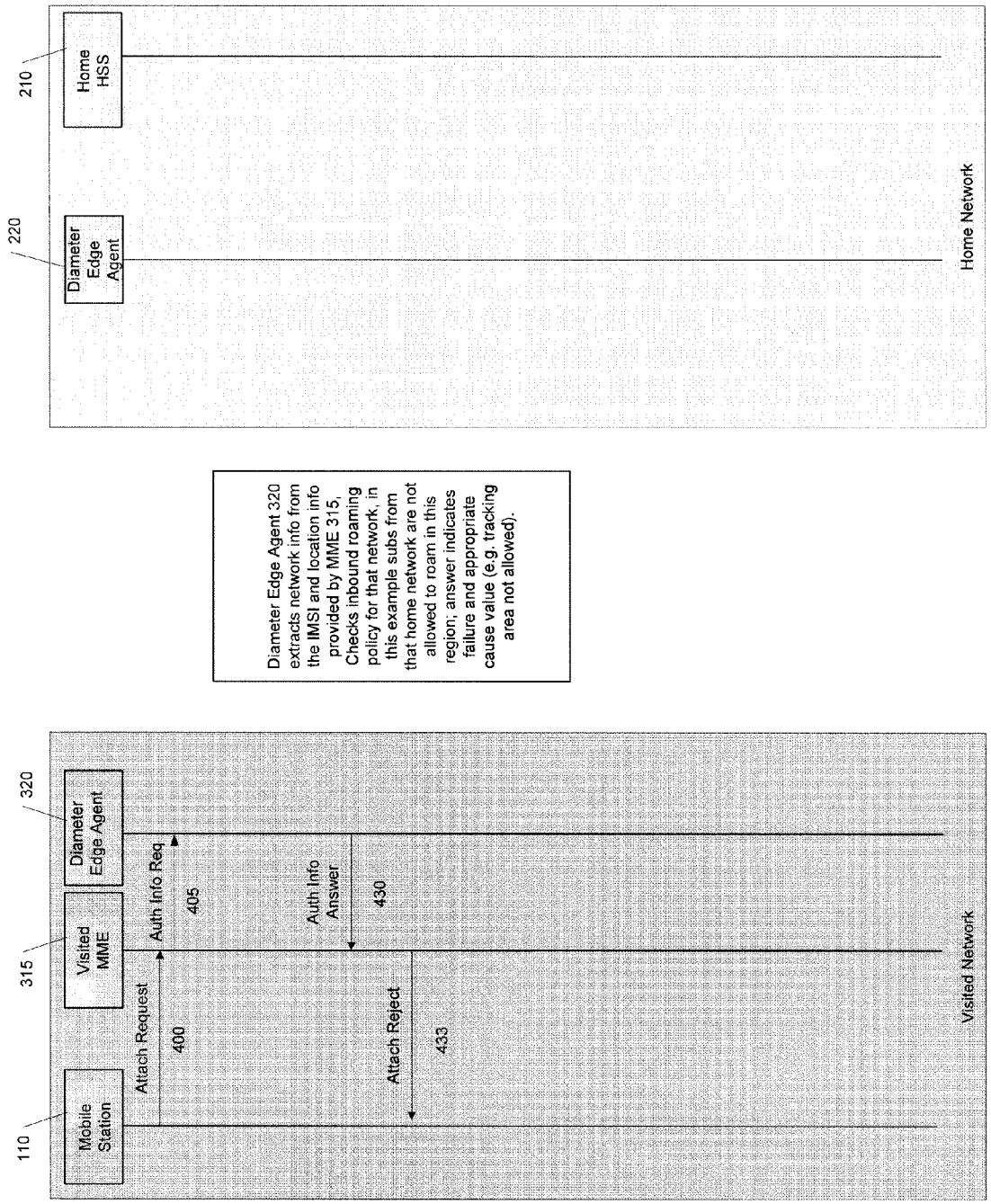
FIG. 2 is a message flow diagram denying authorization a user's mobile station in a roaming area.

FIG. 2 illustrates an example of an authorization message flow diagram when the user's mobile station 110 is roaming, i.e., communicating with base stations 150 within a VPMN 300. FIG. 2 illustrates the example when the roaming is not allowed. When the mobile station 110 wants authorization to use the VPMN 300 (i.e., roam) it sends an attachment request 400 through the base station 150 to the visited MME 315. The MME 315 determines that the mobile station 110 is not a subscriber of its particular network and that it needs authorization to allow the mobile station 110 access to the network. The MME 315 sends an authorization information request 405 to its Diameter edge agent 320. The visited Diameter edge agent 320, in this example, can determine as a first review whether or not the user is authorized to use the VPMN 300.

The VPMN 300 defines and configures the set or rules and policies 325 (see FIG. 1) to be applied at the Diameter edge agent 320 for each roaming agreement or group of roaming agreements. In an example, each roaming agreement can be configured as one or more MCC+MNC (Mobile Country Code+Mobile Network Code) policies 325. The combination of the MMC and MNC can uniquely identify a network provider. For example, each country has an individual MCC (e.g., 310 or 311 for US providers) and each provider has one or more MNCs that is its unique identifier. As an example, Verizon Wireless' MNCs can be 004, 005, and 480. This six-digit code is passed along with an identification number for the individual mobile station 110. Thus, a policy 325 for handling calls from a Verizon Wireless customer in the US can be linked to any ID with the first 6 digits of 310004, 310005, or 311480.

In another example, the policy 325 can include whether or not a roaming agreement exists, if a roaming agreement exists, whether or not roaming is allowed throughout the entire network, and if roaming agreement exists, but roaming is not allowed in the whole network, then a roaming area in which roaming is permitted. The roaming area can be a "white list" (i.e., the list of areas where the user can roam), a "black list" (i.e., the list of areas where the user cannot roam) or both. In a further example, roaming areas for the user can be configured as a set of VPMN IDs (in case the VPMN 300 decides to use different IDs to identify different areas/regions/zones), the MME 315 Host IDs, Tracking Area IDs, or a combination of all of the above.

This saves time, overhead processing, and/or resources for the VPMN 300 since it does not need to initially communicate with the HPMN 200. Previously, the Diameter edge agent 320 communicates with the Diameter edge agent 220 at the HPMN 200. The Diameter edge agent 220, having received the request from the Diameter edge agent 320 would pass the request to the HSS 210, which would formulate a response and send it back to the VPMN 300 back through the previous channels to authenticate the user.

Returning to FIG. 2, once the Diameter edge agent 320 in the VPMN 300 is configured with the appropriate policies, the Diameter edge agent 320 can analyze S6a messages 130 arriving from the MME 315. These messages may include, for example, an Authentication Information Request 405 or an Update Location Request 440 (see below FIG. 3). The Diameter edge agent 320 can analyze the user's International Mobile Subscriber Identity (IMSI) that is passed along in the S6a message 130. The IMSI is a unique identifier stored inside the mobile station 110 and transmitted to the VPMN 300 or HPMN 200. The IMSI can also be used to acquire other details of the mobile station 110 in the HSS 210 or the VPMN 300.

In an example, part of the IMSI includes the MCC and MNC of the HPMN 200. The Diameter edge agent 320 can use this information to look up the policy 325 that applies to the roaming agreement between the visited network provider and the home network provider of the user of the mobile station 110. Based upon the policy 325 and the location information provided, the Diameter edge agent 320 can send the message on towards the HPMN 200. Alternately, if the policy 325 dictates a denial of service, the Diameter edge agent 320 sends back to the MME 315 the authorization information answer 430 telling it to deny the mobile station 110 access. The MME 315 then can transmit an attachment rejection message 433 to the mobile station 110 noting the appropriate cause. Possible causes for rejection can also be, as suggested by standards (3GPP TS 24.301), the HPMN is not allowed use in this VPMN, the Tracking Area is not allowed, and evolved packet system ("EPS") services not allowed in this HPMN.

In another example based on FIGS. 2 and 3, the Diameter edge proxy 320 receives and reviews all roaming communications for VPMN 300. The Diameter edge proxy 320 may receive a subscriber ID (IMSI) and the location of the mobile station 110 from the visited MME 315. Where/when the policy enforcement is applied depends upon the message 405. As in FIG. 2, if the policy is applied to the very first message sent by MME 315 to the Diameter edge agent 320 when the mobile station 110 roams into the VPMN 300 and communicates with the MME 315, the Diameter edge agent 320 sends a reject message in the answer 430 to the MME 315. No messages are sent to the HPMN 200.

However, if the policy is applied to other messages (for example, because the first message does not include required location information), the Diameter edge agent 320 can send a reject message 430 to the MME 315 and a failure indication message (410, 415) to the HSS 210 in the HPMN 200.

In a further example, the existing message interfaces and technical specifications can be used. The improved feature can be the additional functionality of the Diameter edge agent 320. The 3GPP S6a interface specification can include all the parameters required for the Diameter edge agent 320 to make the determinations needed above.

In other examples, the existing specifications may fall short and certain changes and additions can be required in the messages, which include that both the Authentication Information Request 405 and Update Location Request 440 need to include a User-ID (which can be the IMSI), an Origin Host (which can be the Visited MME ID), an Origin Realm (which can identify the VPMN 300), a VPMN ID, and a Tracking Area ID. The Tracking Area ID is already included in other S6a messages such as Insert-Subscriber-Data-Answer within the Evolved Packet System (EPS)-Location-Information Attribute-Value Pairs (AVP), so inclusion into the S6a messages 130 for authorization and update is simple. The Tracking Area ID is a more granular parameter than other parameters, like the MCC/MNC, passed in the messaging scheme. For example, a network may only use one VPMN ID for the whole country, but a Tracking Area ID may be assigned to specific geographical areas within the national network. Further, the Origin Realm parameter is derived from the VPMN 300 ID and is useful because the Origin Realm is present in all messages that are exchanged, but VPMN ID is not typically passed in all messages. Additionally, in other examples, the MME 315 can implement a new trigger for sending the Update Location Request message 440. The MME 315 can inform the HSS 210 about the identity of the MME 315 currently serving the mobile station 110. Also, the MME 315 can provide the HSS 210 with other user data, such as subscriber identification and location.

FIG. 3 illustrates an example of an authorization message flow diagram when the user's mobile station 110 is roaming, i.e., communicating with base stations 150 within a VPMN 300 and the roaming is allowed. When the mobile station 110 wants authorization to use the VPMN 300 (i.e., roam), it sends an attachment request 400 through the base station 150 to the visited MME 315. The MME 315 determines that the mobile station 110 does not subscribe to its particular network and that the mobile station 110 needs authorization to allow the mobile station 110 access to the network. The MME 315 sends the authorization information request 405 to its Diameter edge agent 320.

Here, the Diameter edge agent 320 analyzes the request based on the policy 325 and determines that the mobile station 110 is permitted to roam in the VPMN 300. The policy 325 can be based on, for example, the terms of a roaming agreement the HPMN 200 has with the VPMN 300. This can simplify having up-to-date policies 325 as agreements change, wherein the VPMN 300 does not have to rely on the HPMN 200 to have updated its parameters. This lowers the traffic on the VPMN's network, as at least two more messages 420, 425 in the VPMN 300 were previously required to authenticate the user for roaming.

As can be seen in FIGS. 2 and 3, if the visiting Diameter edge agent 320 can handle the authentication of a visiting mobile station 110 for roaming on the VPMN 300, less or no network traffic may need to be passed between the VPMN 300 and the HPMN 200. FIG. 2 illustrates, and it is explained above, that the MME 315 sends a message to the Diameter edge agent 320 and the Diameter edge agent 320 responds when the roaming service is denied. In the existing system, the VPMN 300 must communicate with the HPMN 200 and wait for a response from the HSS 210. This results in the difference between an intra-network communication and an inter-network communication, the intra-network communication being faster. The faster communication provides quicker notification to the user and removes the query from the queue of both elements (MME 315 and Diameter edge agent 320).

Turning to an approval, once the visited Diameter edge agent 320 authenticates the user, it then communicates 410 with the Diameter edge agent 220 on the HPMN 200. This communication is typically over the network 140, which can use an internetwork packet exchange (IPX). On the HPMN 200 side, the Diameter edge agent 220 communicates the authorization information request 415 to the HSS 210.

The HSS 210 then reviews the request and transmits an authorization information answer 420 back to the Diameter edge agent 220. In this example, the user is authorized to roam in the VPMN 300. The Diameter edge agent 220 then transmits the authorization information answer 425 to the visited Diameter edge agent 320 who then transmits the answer 430 to the MME 315. The MME 315, through the base station 150, authenticates the mobile station 110 in a back and forth communication 435. The authentication procedure 435 between the mobile station 110 and the MME 315 can involve multiple messages per current 3GPP standards (Authentication Request/Response, Security Mode Command/Complete, etc). The content and frequency of these messages are known to those of ordinary skill in the art. Errors in the Diameter edge agent 320 authenticating a roaming mobile station 110 are few and do not affect system performance. If the Diameter edge agent 320 improperly allows roaming, and sends a communication to the HPMN 200, the HSS 210 returns the appropriate reject message. If the Diameter edge agent 320 improperly denies access then all other attempts by the mobile station 110 to roam on the VPMN 300 are rejected. The HSS 210 may not be communicated with to confirm the rejections.

Once the mobile station 110 is authenticated, the MME 315 sends an update location request 440 to the Diameter edge agent 320. As noted above, the update location request 440 is also a message that can be analyzed by the Diameter edge agent 320. Again, the Diameter edge agent 320 analyzes the policy 325 to determine if roaming is permitted in this instance. As roaming is allowed, the Diameter edge agent 320 passes the update location request 445 along to the home Diameter edge agent 220. The update location request is then passed 450 to the HSS 210.

At least the authorization information request and the update location request communications between the MME 315 and the HSS 210 (405, 410, 415, 440, 445, 450), in this example can be sent using the S6a protocol and can include, among other parameters, the User-ID, the Origin Host, the Origin Realm, the VPMN ID, and the Tracking Area ID.

The HSS 210, after receiving the update location request 450, retrieves the user profile 125 and responds back to the Diameter edge agent 220 with the update location answer message 455. The message 455 can include information identifying the VPMN 300 the user is roaming in, as well as the user profile which provides the permissions and limitations for the user while roaming in the VPMN 300.

The modified update location answer message 460 is communicated to the visited Diameter edge agent 320 which passes it 465 to the MME 315. The visited MME 315 in turn uses the profile 125 information it receives to, in one example, accept or deny packet data network (PDN) requests from the roaming users from the HPMN 200.

In another example, the same logic in the Diameter edge agent 320 can be implemented in the MME 315. However, a VPMN 300 usually has many MMEs 315 in a network while only a few Diameter edge agents 320. Thus, there are operational efficiencies in implementing such policies at the Diameter edge agent 320 as opposed to the MME 315.

The communications 410, 425, 445, and 460 between the two Diameter proxies 220, 320 can typically be over the network 140, which can use an internetwork packet exchange (IPX). In this example, all communications from the MME 315 to the HSS 210 and back can be made using the S6a protocol 130.

Figure 4:
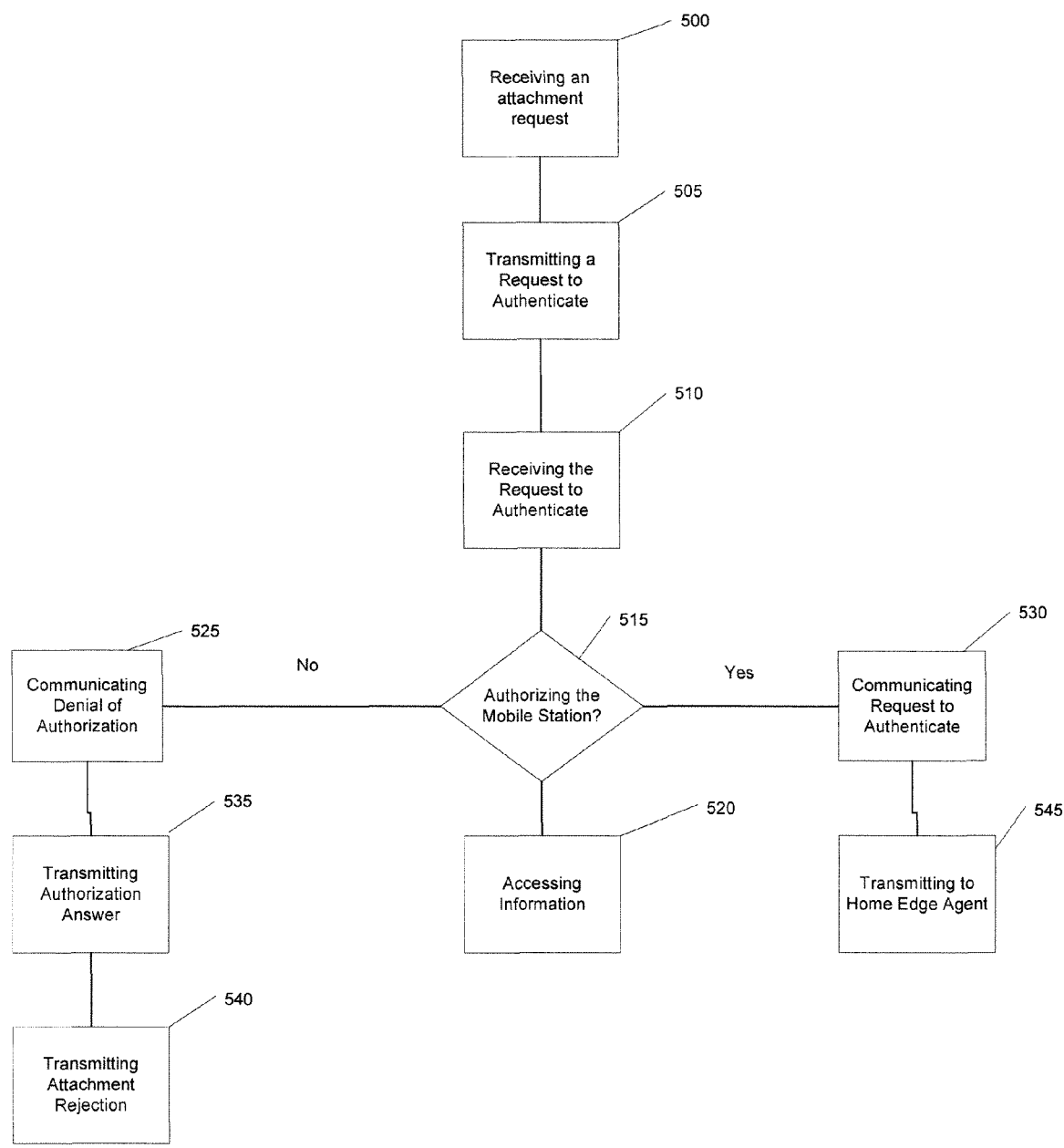
FIG. 4 is a flow diagram describing an example of authorizing a user's mobile station in a roaming area.

FIG. 4 illustrates a method for authenticating the roaming mobile station 110 in the VPMN 300. As noted above, the mobile station 110 is subscribed to the HPMN 200. Some of the steps include receiving, at the visited MME 315, an attachment request 400 from the mobile station 110 (step 500). The MME 315 then transmits to the visited Diameter edge agent 320 the request to authenticate (step 505). The request to authenticate can either be the authorization information request message 405 or the update location request message 440, as determined by the MME 315. The visited Diameter edge agent 320 may be located within the VPMN 300 or it can be a service hosted by the VPMN's IP Exchange (IPX) provider. The Diameter edge agent 320 receives the request to authenticate (step 510) and proceeds to authorize the mobile station 110.

Determining the authorization of the mobile station 110 on the VPMN 300 is based on one or more parameters in the request (step 515). The parameters can be a HPMN identifier and can include at least one of the IMSI, the MCC, the MNC, the Origin Host, the Origin Realm, the VPMN ID, and the Tracking Area ID. Note that some of the above parameters are already present in the existing request to authenticate, others can be added to the request to authenticate. One example of an additional parameter is the Tracking Area ID.

The parameter is used to determine and access the policy 325 stored on the visited Diameter edge agent 320. The policy 325 comprises information regarding the acceptance or the denial of service for the home network identifier. The policy 325 can be based on an agreement between the HPMN 200 and the VPMN 300. Authorizing includes accessing the information based on the home network identifier to determine authorization (step 520). Once the authorization has completed, the Diameter edge agent 320 can communicate a denial of authorization to the visited network (step 525) or can communicate the request to authenticate the mobile station on the visited network to the HPMN 200 (step 530). The communication is based on whether the policy 325 identifies a denial or acceptance of service.

If the Diameter edge agent 320 denies the authorization of the mobile unit 110, then the Diameter edge agent 320 transmits the authorization answer 430 to the visited MME 315 (step 535) with the denial. The visited MME 315 can then transmit to the mobile station 110 an attachment rejection 433 (step 540). Alternately, in the example of when the policy 325 identifies an acceptance of service, the authorization request can be transmitted to the home Diameter edge agent 220 controlled by the HPMN 200 (step 545). The authorization request can be, in one example, at least one of the authorization information request 410 or the update location request 445.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code for the intelligent messaging system. The software code is executable by the general-purpose computer that functions as a web server, application server(s) and/or MMEs, proxies, HHSs, etc. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to determine if a mobile station can roam in a visiting network without communication with the home network, in essentially the manner performed in the implementations discussed and illustrated herein.

A wireless mobile communication network between the mobile station 110 and the base station 150 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile station 110 may be capable of conventional voice telephone communications and data communications. A variety of different types of mobile stations supporting such communications are widely available. Today, mobile stations typically take the form of portable handsets, smart-phones or personal digital assistants, although they may be implemented in other form factors.

Figure 6:
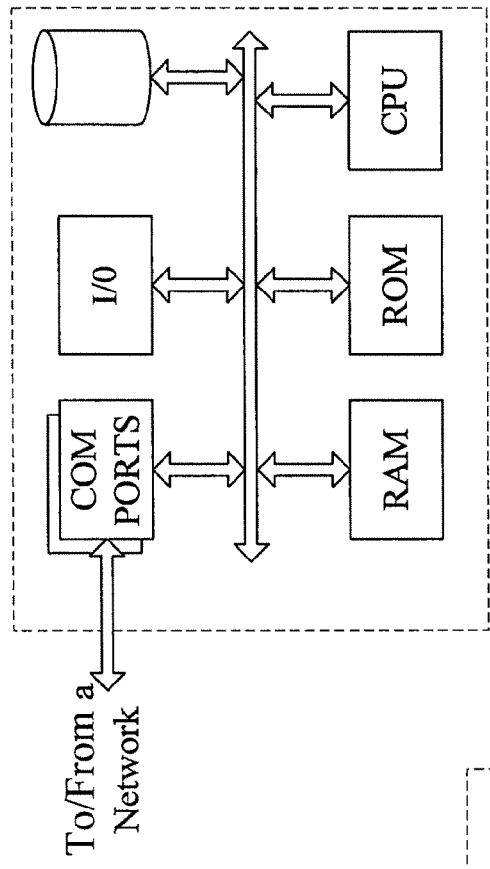
FIG. 6 is a simplified functional block diagram of a computer that may be configured to function as any of the systems of FIGS. 1 and 2.
Figure 7:
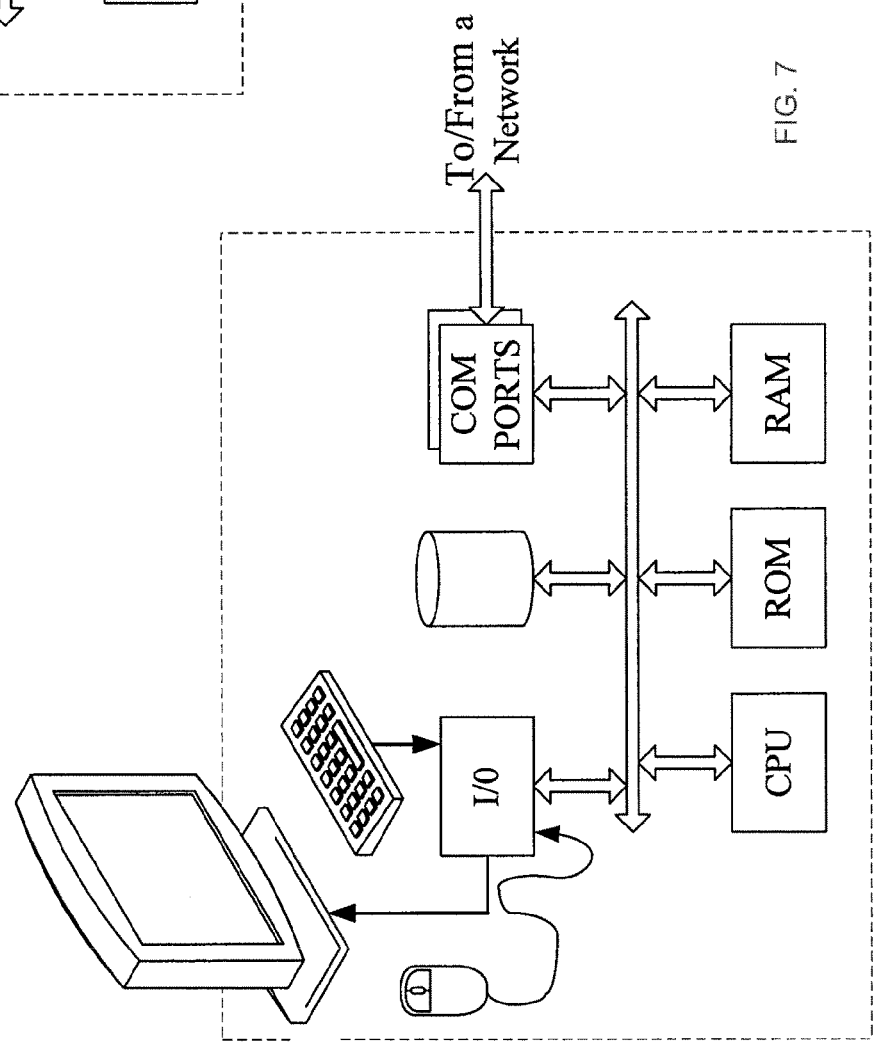
FIG. 7 is a simplified functional block diagram of a personal computer or other work station or terminal device that may be configured to function as any of the systems of FIGS. 1-3.

FIGS. 6 and 7 provide functional block diagram illustrations of general purpose computer hardware platforms for at least the HSS. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and terminal device computers are conventional in nature, and it is presumed that those skilled in the art are adequately familiar therewith. Of course, the server functions may be implemented in a distributed fashion on a number of similar platforms, to distribute the processing load.

Hence, aspects of the methods of roaming control, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable the transmission of the S6a message. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising the steps of:
   receiving, at a visited Diameter edge agent controlled by the visited network, an authorization information request transmitted by a visited mobility management entity (MME) requesting authentication of a mobile station, subscribed to a home network, on a visited network, wherein the authorization information request includes an identifier of the mobile station and a tracking area identifier of the mobile station provided by the visited MME;
   obtaining the tracking area identifier of the mobile station from the authorization information request;
   extracting home network information related to the mobile station from the mobile station identifier included in the authorization information request;
   based on the mobile station identifier and the tracking area identifier in the authorization information request, identifying at least the home network of the mobile station and a policy related to the identified home network;
   accessing the identified policy stored at the visited Diameter edge agent, wherein the identified policy is stored at the visited Diameter edge agent prior to receiving the authorization information request from the visited MME;
   based on information in the identified policy, determining, at the visited Diameter edge agent, acceptance of the mobile station to use the visited network, wherein the information in the identified policy includes an acceptance of service and an indication that the mobile station is authorized to use the visited network; and
   in response to the determination based on the information in the policy that the mobile station is accepted to use the visited network, communicating, with the home network via a home Diameter edge agent of the home network, a request to authorize the mobile station on the visited network.

2. The method of claim 1, wherein the policy comprises information regarding the acceptance or a denial of service dependent on a mobile country code and a mobile network code in a home network identifier provided in the request to authenticate; and
   wherein the policy is identified based on the mobile country code and the mobile network code in the home network identifier to determine authorization.

3. The method of claim 1, further comprising the steps of:
   receiving, at the visited MME, an attachment request from the mobile station; and
   transmitting, from the visited MME to the visited Diameter edge agent, the authorization information request the mobile station in response to receiving the attachment request.

4. The method of claim 1, further comprising the step of communicating a denial of authorization when the policy identifies a denial of service for the mobile station to use the visited network.

5. The method of claim 4, wherein the communicating the denial step comprises the steps of:
   transmitting an authorization answer to the visited MME; and
   transmitting to the mobile station, by the visited MME, an attachment rejection in response to receiving the authorization answer.

6. The method of claim 1, wherein the policy is based on an agreement between the home network and the visited network.

7. The method of claim 1, wherein the visited Diameter edge agent communicates with the home network only when the policy identifies acceptance of service.

8. An article of manufacture, comprising:
   at least one non-transitory machine readable storage medium; and
   programming instructions embodied in said at least one non-transitory machine readable storage medium for execution by one or more computers, wherein the programming configures said one or more computers to be capable of performing functions for providing information on a visited network, the functions comprising:
   receiving an authorization information request transmitted by a visited mobility management entity (MME) to authenticate a mobile station, the mobile station subscribed to a home network, on the visited network, wherein the request includes an identifier of the mobile station and a tracking area identifier of the mobile station provided by the visited MME;

obtaining the tracking area identifier of the mobile station from the authorization information request;

extracting home network information related to the mobile station from the mobile station identifier included in the authorization information request;

based on the mobile station identifier and the tracking area identifier in the authorization information request, identifying at least the home network of the mobile station and a policy related to the identified home network;

accessing the identified policy stored at a visited Diameter edge agent, wherein the identified policy is stored at the visited Diameter edge agent prior to receiving the authorization information request from the visited MME;

based on information in the identified policy, determining by the visited Diameter edge agent an acceptance of the mobile station on the visited network, wherein the information in the identified policy includes an acceptance of service and an indication that the mobile station is authorized to use the visited network; and in response to the determination based on the information in the policy that the mobile station is accepted to use the visited network, communicating, to the home network via a home Diameter edge agent of the home network, a request to authorize the mobile station on the visited network.

9. The article of claim 8, wherein the policy comprises information regarding the acceptance or the denial of service dependent on a mobile country code and a mobile network code in a home network identifier provided in the request to authenticate; and wherein the policy is identified based on the mobile country code and the mobile network code in the home network identifier to determine authorization.

10. The article of claim 8, wherein the functions of the programming instructions further comprise:

receiving, at the visited MME, an attachment request from the mobile station; and transmitting, from the visited MME to a visited proxy, the authorization information request the mobile station in response to receiving the attachment request.

11. The article of claim 8, wherein the functions of the programming instructions further comprise communicating a denial of authorization to the visited network when the policy identifies a denial of service.

12. The article of claim 11, wherein the functions of the programming instructions for communicating the denial comprise:

transmitting an authorization answer to a visited MME; and transmitting to the mobile station, by the visited MME, an attachment rejection in response to receiving the authorization answer.

13. The article of claim 8, wherein the policy is based on an agreement between a home network of the mobile station and the visited network.

14. The article of claim 8, wherein the communication with the home network is only when the policy identifies an acceptance of service.

* * * * *